SURFACE-BARRIER DIODE TRANSDUCER USING HIGH DIELECTRIC SEMICONDUCTOR MATERIAL

Filed June 28, 1965

INVENTORS D. KAHNG
S. H. WEMPLE
BY
Sylvan Sherman
ATTORNEY

United States Patent Office 3,443,041

Patented May 6, 1969

3,443,041

SURFACE-BARRIER DIODE TRANSDUCER USING HIGH DIELECTRIC SEMICONDUCTOR MATERIAL

Dawon Kahng, Somerville, and Stuart H. Wemple, Madison, N.J., assignors to Bell Telephone Laboratories, Incorporated, New York, N.Y., a corporation of New York Filed June 28, 1965, Ser. No. 467,211
Int. Cl. H04r 17/02, 21/02
U.S. Cl. 179—121 8 Claims

ABSTRACT OF THE DISCLOSURE

This application describes high-sensitivity electromechanical transducers comprising surface-barrier diodes made of semiconductor materials having dielectric constants between 100 and 1000.

In one specific embodiment disclosed the transducer comprises a crystal of n-type semiconducting potassium tantalate upon which a metal-to-semiconductor rectifying barrier is formed by the vacuum deposition of gold onto one surface of the crystal. More generally, other semiconductors of the perovskite class of ferroelectric materials, and mixtures thereof, such as potassium tantalate niobate, can also be used.

This invention relates to semiconductor electromechanical transducers.

It has long been known that carbon microphones become relatively insensitive under certain operating conditions. This decrease in sensitivity is a result of what is commonly referred to as "carbon packing," although it can involve much more than the mere compression of the carbon granules.

Carbon packing is particularly severe in wall telephone sets in which the transmitter is suspended vertically and, in normal use, is not frequently rotated. Since the number of wall sets currently in use represents about 25 percent of all the stations in service, it is evident that carbon packing in telephone transmitters is a problem of substantial importance.

It is accordingly the general object of this invention to improve the performance of electromechanical transducers such as microphones, phonograph pickups and the like.

The present invention is predicated upon the fact that the impedance across a rectifying barrier in a body of semiconductor material is pressure sensitive. One type of prior art semiconductor microphones utilizes a p-n junction in a body of elemental semiconductive material, such as germanium or silicon. Such a junction is produced at the interface of two zones of opposite conductivity type ( p and n) in a body of elemental semiconductive material, as disclosed, for example, in United States Patent 2,632,062, issued to H. C. Montgomery on Mar. 17, 1953. To be competitive with the carbon microphone used in present day telephones, however, a semiconductor microphone would have to show a substantial improvement in sensitivity and/or reliability over what is presently the level of performance typical of p-n junction semiconductor microphones of the type disclosed in the prior art.

In accordance with the present invention, improved semiconductor transducers are obtained using a rectifying barrier formed in a compound semiconducting material having a high dielectric constant. The semiconducting material is advantageously, though not necessarily, a ferro-electric material of the perovskite class, operating either above or below its Curie temperature, and whose carrier concentration is of the order of $10^{17}$ to $10^{19}$ carriers per cubic centimeter. It has been discovered that the combination of high dielectric constant and high carrier concentration results in a transducer having a degree of reliability and a pressure sensitivity that is significantly greater than the realized heretofore.

In one specific embodiment of the invention, the transducer comprises a crystal of n-type semiconducting potassium tantalate ($KTaO_3$), having a carrier concentration of $5\times10^{18}$ electrons per cubic centimeter. A metal-to-semiconductor rectifying barrier is formed by the vacuum deposition of gold onto one surface of the crystal, and an ohmic contact is made to a second surface of the crystal by vapor deposition of chromium with an overlay of gold. For use as a microphone, pressure is applied to the diode by means of a rounded stylus which is connected to a diaphragm. A direct current source is connected across the diode through a load temperature.

Variations in pressure produced by sound waves incident upon the diaphragm modulate the pressure applied across the rectifying barrier. This, in turn, modulates the current flowing through the load impedance. The response has been found to be substantially linear over a useful range of pressure variations, and uniform over a wide range of audio frequencies.

These and other objects and advantages, the nature of the present invention, and its various features, will appear more fully upon consideration of the various illustrative embodiments now to be described in detail in connection with the accompanying drawings, in which.

Figure 1:
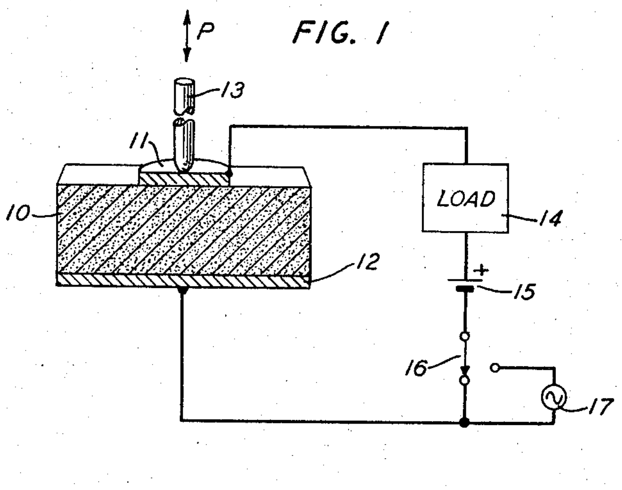
FIG. 1 shows a semiconductor electromechanical transducer in accordance with the invention.

Referring to the drawing, the electromechanical transducer illustrated in FIG. 1 comprises a crystal 10 of a compound semiconducting material. Since the pressure sensitivity of the transducer is a function of the dielectric constant of the semiconducting material, it is advantageous that the dielectric constant be high. In accordance with the invention, it is contemplated that the materials having dielectric constants between about 100 to 1000 will be used. In addition, to realize the advantages of a high dielectric constant, the material advantageously has a saturation polarization greater than about 10 microcoulombs per square centimeter.

It is characteristic that semiconductors of the perovskite class of ferroelectric materials, and mixtures thereof, such as potassium tantalate niobate, have the desired, overall properties. (For a listing and discussion of these materials, see "Ferroelectric Crystals" by F. Jona and G. Shirane, published by the MacMillan Company, New York, 1962.) In particular, potassium tantalate, $KTaO_3$, appears to be a preferred material. Accordingly, in a preferred embodiment of the invention, the crystal 10 is made of potassium tantalate.

Another material of particular interest is the mixture of potassium tantalate and potassium niobate, $$(KTa_xNb_{1-x}O_3)$$

It is an advantage of this material that the Curie temperature and, hence, the dielectric constant of the material depends upon the ratio of the mixture. Thus, by the simple expedient of changing the relative proportion of tantalate to niobate, a material of particular dielectric constant can be obtained.

Because the pressure sensitivity varies as a function of the carrier concentration, a crystal with a high carrier concentration is preferred. However, above $10^{19}$ carriers per cubic centimeter, the depletion region may become sufficiently small to permit tunneling. Accordingly, an upper limit, of the order of $10^{19}$ carriers per cubic centimeter is contemplated. In a particular embodiment, constructed in accordance with the invention, a carrier concentration of $5\times10^{18}$ electrons per cubic centimeter was used.

As is well known, the desired carrier concentration can be realized by the introduction of extraneous material (doping), or as a consequence of lattice defects, or both. In crystals of potassium tantalate, for example, oxygen vacancies in the crystal lattice behave as electron donors.

A rectifying barrier is made on the upper surface of crystal 10 by the deposition, by known means, of a layer of metal 11, whose work function is greater than the work function of potassium tantalate. Typical of such metals are gold and platinum. The resulting metal-semiconductor contact produces a rectifying barrier of the type described by J. N. Shive in his book entitled "The Properties, Physics, and Design of Semiconductor Devices," published by the D. Van Nostrand Company, Inc., of New Jersey, chapter 20.

Ohmic contact is made by the deposition of a layer of metal 12 on a second surface of crystal 10. The metal used for this purpose advantageously is one exhibiting a strong affinity for oxygen. Typical of such metals are chromium, aluminum and titanium. In the embodiment of FIG. 1, an initial chromium film is deposited directly onto the potassium tantalate, followed by a pure gold film to serve as a protective overlay.

It is to be understood that insofar as the present invention is concerned, the particular materials and method used to make rectifying and ohmic contacts to the crystal 10 are illustrative. Other materials and methods can be used as would be well known to those skilled in the art.

Pressure P is applied to the rectifying barrier by means of a rounded stylus 13 in contact with the metallic layer 11. Typically, stylus 13 is connected to a loudspeaker coil or to a phonograph pickup, although other uses can be made of the device.

Changes in impedance, primarily resistive, produced by changes in pressure across the rectifying barrier are detected in an electrical circuit connected in series with the rectifying barrier. In FIG. 1, the electrical circuit comprises a load impedance 14, one terminal of which is connected to metallic layer 11, and the other terminal of which connects to the positive terminal of a direct current potential source 15. The negative terminal of source 15 is connected to metallic layer 12 through a single pole, double throw switch 16.

The direct current potential applied as discussed above, and shown in FIG. 1 is to forward bias the rectifying barrier. Although the polarity of the battery 15 can be reversed so as to operate the transducer in the reverse biased condition, the forward biased condition is preferred because of better reproducibility and decreased temperature sensitivity.

Also shown in FIG. 1 is a signal source 17. The reason for including switch 16 and signal source 17 will be explained hereinbelow.

In operation as a microphone, a pressure bias is applied across the rectifying barrier by presetting the stylus pressure. Typically, an adjustable member (not shown) is provided for this purpose. So adjusted, a current flows through the rectifying barrier formed by the metallic layer 11 and the semiconducting crystal body 10.

As the pressure applied to the rectifying barrier is varied in response to a signal, such as sound waves incident upon a speaker diaphragm attached to stylus 13, the pressure across the rectifying barrier varies, causing the impedance of the barrier to change. These changes in barrier impedance cause the current flowing through load resistor 14 to change correspondingly.

As pressure is applied to the rectifying barrier, as a result of mechanical movement of the stylus 13, there is an associated stress produced in the semiconducting material, which, in turn, results in a voltage change across the barrier. Conversely, if the voltage applied to the barrier is changed, there is an associated stress produced in the material which produces mechanical movement of the stylus. Accordingly, the electromechanical transducer described hereinabove can also be used as a speaker by applying an electrical signal across the barrier and connecting a diaphragm to the stylus. When so used, the switch 16 is thrown from switch position 1 to switch position 2, thereby including the signal source 17 in the electrical circuit connected to the transducer.

In one specific embodiment of the invention, crystal 10 comprised a 0.1 inch x 0.2 inch x 0.05 inch block of potassium tantalate having a specific resistivity of 0.1 ohm-cm. The rectifying barrier was produced by a dot of gold approximately 2000 A. thick and having a radius of about 50 mils deposited on a freshly cleaved surface of the crystal. Ohmic contact was made with an initial chromium film of between 200–500 A. thick, followed by a film of pure gold approximately 2000 A. thick.

Contact to the gold dot was by means of a stylus having a one to ten mil radius point. A three volt D.C. source was connected across the diode through a 100 ohm resistive load.

For typical voice pressures of the order of 10 dynes/cm.$^2$, a peak-to-peak voltage of 5 mv. was produced across the load resistor. This represents an output power in the 100 ohm resistor of −75 db below one watt. It is anticipated, however, that by improving the match to such devices, an increase in sensitivity of the order of at least 10 db can be realized. While this is still lower than the power output obtainable with a carbon microphone, the ability to obtain gain in a small volume using integrated circuitry, makes this a matter of minor signficance. Of more significance the semiconductor microphone is not subject to packing; has less amplitude distortion; is chemically more stable and, hence, less subject to aging; and is substantially smaller than the chamber containing the carbon granules customarily used in telephone microphones.

Prior art p-n semiconductor transducers made of silicon and germanium have been made with power sensitivities that are comparable to those obtainable with transducers made in accordance with the present invention. However, this has been achieved at the expense of reliability and reproducibility. This exchange of reliability and reproducibility for sensitivity comes about because of the requirement that the pressure applied to the crystal in a prior art transducer be of the order of ten times the pressure applied to the crystal in a transducer of the type described herein, in order to realize comparable sensitivities. This requirement is normally satisfied by reducing the stylus diameter which, in turn, tends to make such devices particularly sensitive to shock. This sensitivity materially limits their general application to commercial devices requiring a high degree of reliability. When styluses of larger diameter are used in a prior art transducer, comparable power sensitivities have been obtained when the crystal surface of the prior art transducer has been prestressed to such an extent as to deliberately damage the surface. This also tends to make the transducer less reliable and less reproducible. Accordingly, with respect to such factors as resistance to shock, reproducibility and temperature insensitivity, transducers in accordance with the present invention appear to have a significant advantage.

Figure 2:
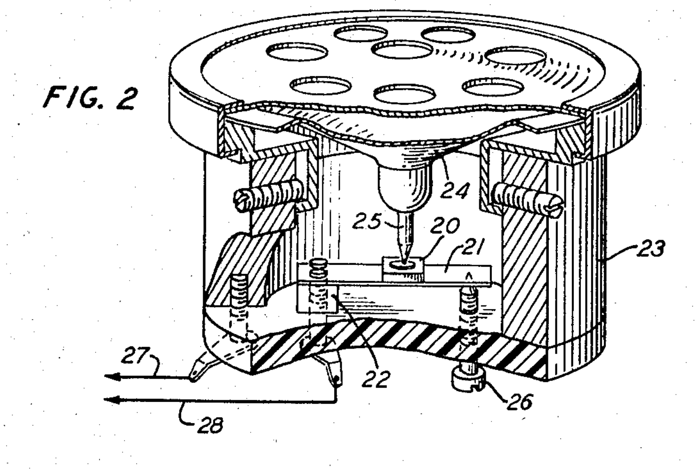
FIG. 2 shows a first embodiment of a microphone in accordance with the invention.

FIG. 2 shows, in somewhat greater detail, a microphone in accordance with the present invention, intended for use in a telephone. The microphone comprises a pressure sensitive semiconductor diode 20, of the type described hereinabove, mounted on a metallic cantilever member 21. The cantilever is mounted on an insulating block 22, and the entire assembly is contained within a suitable housing 23.

A speaker diaphragm 24 seals one side of the enclosure, and applies pressure to the diode 20 by means of a stylus 25, mounted at the center of the diaphragm. The pressure bias applied to the diode is adjusted and set by means of a screw 26 which contacts the underside of cantilever 21 and thereby exerts upward pressure on the diode.

Electrical connection is made to the microphone by way of the leads 27 and 28, which contact opposite sides of diode 20 through the enclosure 23 and diaphragm 24.

Figure 3:
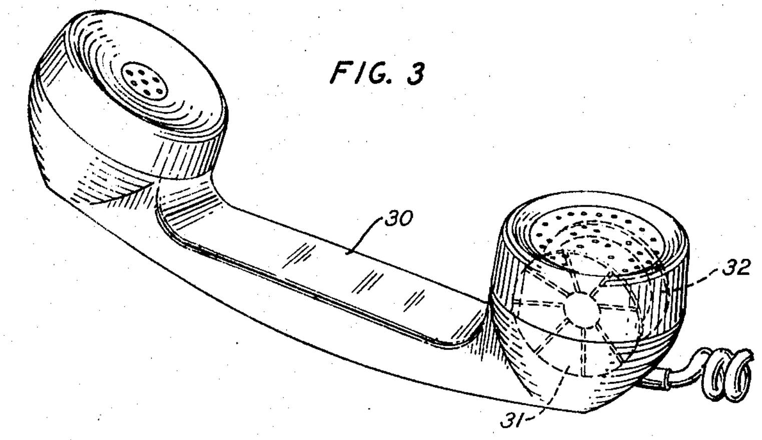
FIG. 3 shows a microphone using a pair of diaphragms to shock mount the semiconductor pressure sensitive element.

FIG. 3 shows a second embodiment of a microphone, for use in a telephone handset 30, utilizing a semiconducting pressure sensitive element in accordance with the present invention. This microphone employs a double diaphragm for shock mounting the diode, and is described more fully and claimed particularly in the copending application by H. K. Gummel and V. L. Rideout, Ser. No. 467,212, filed concurrently with this application and assigned to applicants' assignee. In this embodiment, the diode is mounted on one of the diaphragms 31, and the contacting stylus is mounted on the second diaphragm 32.

The diaphragms are mounted in the handset such that sound waves enter the handset and exert pressure upon both diaphragms at the same time. However, if mechanically shocked, both diaphragms are free to move in the same direction, and, hence, the diode is subjected to very little compressive or tensile forces.

In the illustrative embodiment described, a metal-semiconductor rectifying barrier is disclosed and described. However, the principles of the invention are not limited to this particular type of rectifying barrier. For example, a p-n junction rectifying barrier, formed in the class of ferroelectric materials identified hereinabove, can in theory be alternately employed as the pressure sensitive element in a similar fashion. Thus, in all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. An electromechanical transducer including:

a diode comprising a crystal of compound semiconducting material having a dielectric constant between 100 and 1000;

a first metal in contact with one surface of said material forming a rectifying barrier;

a second metal in contact with another surface of said material forming an ohmic contact;

means for applying a varying pressure across said rectifying barrier;

and means connected between said metals for utilizing the variations in electrical energy produced in response to said variations in pressure.

2. The transducer according to claim 1 wherein said material is a ferroelectric material of the perovskite class.

3. An electromechanical transducer comprising:

a semiconductor crystal of n-type potassium tantalate;

a first metal whose work function is larger than the work function of potassium tantalate in contact with one surface of said crystal to form a rectifying barrier;

a second metal having an affinity for oxygen in contact with a second surface of said crystal to form an ohmic contact;

means for applying a varying pressure to said rectifying barrier;

and electrical means connected across said barrier for sensing the change in resistivity of said rectifying barrier in response to said variations in pressure.

4. The transducer in accordance with claim 3 wherein said first metal is gold.

5. The transducer in accordance with claim 3 where in said second metal is chromium.

6. An electromechanical transducer comprising a crystal of ferroelectric semiconducting material of the perovskite class;

said crystal having therein a rectifying barrier;

means for applying a varying pressure across said barrier;

and means for sensing the variations in impedance of said barrier produced by said variations in pressure.

7. An electromechanical transducer for converting energy between electrical and mechanical forms comprising a crystal of semiconducting material having a dielectric constant between 100 and 1000;

said crystal having therein a rectifying barrier;

and means associated with said transducer for applying energy in one of said forms to said transducer and for extracting energy in the other of said forms from said transducer.

8. The transducer according to claim 7 wherein said material is a ferroelectric material of the perovskite class.

References Cited

UNITED STATES PATENTS

| | | | |
|---|---|---|---|
| 2,632,062 | 3/1953 | Montgomery | 179—121 |
| 3,107,277 | 10/1963 | Rogers | 179—110 |
| 3,182,492 | 11/1965 | Sikorski | 73—38.5 |
| 3,215,787 | 11/1965 | Hill | 179—110 |

OTHER REFERENCES

Rogers, E. S.: Expermiental Tunnel-Diode Electromechanical Transducer Elements and Their Use in Tunnel-Diode Microphones In the Journal of the Acoustical Society of America, 34(7): pp. 883–893, July 1962.

KATHLEEN H. CLAFFY, *Primary Examiner.*

A. A. McGILL, *Assistant Examiner.*

U.S. Cl. X.R.

317—235